United States Patent [19]

Lee

[11] Patent Number: 4,885,988

[45] Date of Patent: Dec. 12, 1989

[54] PORTABLE TROLLEY BARBECUE

[76] Inventor: Wilson Lee, No. 34, Lane 155, Yen Pin North Rd., Sec. 6, Taipei, Taiwan

[21] Appl. No.: 265,976

[22] Filed: Nov. 2, 1988

[51] Int. Cl.⁴ .............................................. A47J 33/00
[52] U.S. Cl. ........................................ 99/449; 99/393; 126/9 R; 126/9 B; 126/38; 211/149
[58] Field of Search ................. 99/393, 396, 401, 402, 99/421 HH, 448, 449; 126/38, 9 B, 9 R, 9 A; 211/134, 149, 186, 151; 312/261, 317 R, 321, 330 R, 333

[56] References Cited

U.S. PATENT DOCUMENTS

| | | | |
|---|---|---|---|
| 1,686,620 | 10/1928 | Lindemann et al. | 126/38 |
| 1,708,424 | 4/1929 | McLeskey | 126/9 B |
| 2,477,529 | 7/1949 | Sprinkle et al. | 126/9 R |
| 3,611,912 | 7/1969 | Choc | 99/393 X |
| 4,166,413 | 9/1979 | Meszaros | 99/393 |

*Primary Examiner*—Jimmy G. Foster
*Assistant Examiner*—Christine A. Peterson

*Attorney, Agent, or Firm*—Varndell Legal Group

[57] ABSTRACT

The present invention relates to a portable trolley barbecue, which is built up to form a trolley barbecue with some table plates provided for allocation of certain articles thereon, and which is collapsed to become a portable configuration for carriage and storage. By way of two lateral curved frames arranged at both sides by slip joint to lock up the base of the oven at the time the component parts been arranged inside the base. The two curved frames are pushed outward to provide a respective handle for hands to push and pull, and for a table plate to place thereon. Four pieces of stands are collapsibly arranged at the four corners of the base of the oven, with one pair of the stands respectively connected with a wheel. A cover plate provided to cover the base of the oven at the time the oven is collapsed, is separated from the oven and connected with the four stands by releasable joints to provide a place below the base of the trolley barbecue for certain articles to arrange thereon.

2 Claims, 5 Drawing Sheets

PORTABLE TROLLEY BARBECUE

BACKGROUND AND SUMMARY OF THE INVENTION

In the modern industrial society, because of excessively seeking for physical enjoyment, people may feel empty in mind, and body and mind may not be in a state of equilibrium. Therefore, outdoor activities such as outing and traveling etc., are very invited by the people. While having an outdoor activity, people may prepare barbecue and some other foods to eat. More particularly, barbecue has become a fad of the time in North American and European countries. Traditionally, people may lay bricks and stones for setting a frame to roast meat. However, this traditional method can only roast a small amount of meat at a time and may cause pollution while burning. And more particularly, it is difficult to build a fire. Therefore, several kinds of baking ovens have been created to serve the people. Among the baking ovens, the old kinds of fixed type which are heavy and not convenient for carriage and storage can never satisfy the consumers. Instead, the collapsible type which is light in weight, convenient for carriage and storage, and applicable for either indoor or outdoor use is preferably more acceptable to consumers. However, not all collapsible baking ovens can satisfy consumers' requirement. Since the time is changed and the living standard has been improving, people may require a baking oven which is practical, portable, and collapsible. Although the baking ovens of collapsible type can minimize space occupation when collapsed, they may have to be placed on the ground for use. While in application, people may have to squat to roast meat. After long time of squatting people may feel uncomfortable. Further, while roasting, some seasonings may be prepared at the side of the oven for ready use. However, regular baking ovens are not equipped with table plate or frame stand or the like for allocation of seasonings. Therefore the seasonings may have to be placed on the ground. Since the ground may be uneven, the seasonings that are placed on the ground may be easy to fall. For big baking ovens, people may have to prepare an additional table plate for placing seasonings and some other articles. This is really embarrassing to carry such a table plate. Therefore, these single purpose baking ovens can not fully satisfy the consumers. Although there are some kind of baking ovens comprising stand frames, such stand frames are of independent type and have to be carried separately. While using such said stand frame to set up baking oven, it will be unstable if no additional reinforcing table plate is used. If a table plate is used, it must be separately carried. In order to meet the requirement for a baking oven which is practical in use and convenient for carriage and storage, the present portable trolley barbecue is thus created to satisfy consumers.

The main object of the present invention is to provide a portable trolley barbecue, wherein an expansion frame is bilaterally arranged at both sides of the oven to lock up a cover plate with the base of the oven, which may be pulled outward to form a handle for hands to push and pull, or for respective table plate to place thereon, so as to fully utilize the component parts and to provide additional space for use.

Another object of the present invention is to provide a portable trolley barbecue wherein a cover plate is provided to cover the base of the oven, which can also be connected with the four stands of the trolley barbecue to stabilize the whole assembly and to provide additional space for arrangement of certain articles thereon.

A yet further object of the present invention is to provide a portable trolley barbecue, which may be set up to provide wheels so as to form a trolley for push and pull, and which may be collapsed into a rectangular parallelepiped configuration to minimize the space for easy carriage and storage.

The above and other objects, features and advantages of the present invention will be fully understood from the following description considered in connection with the accompanying drawings which illustrate the best mode for practicing the present invention.

DETAILED DESCRIPTION OF THE PREFERRED EMBODIMENT

Figure 1:
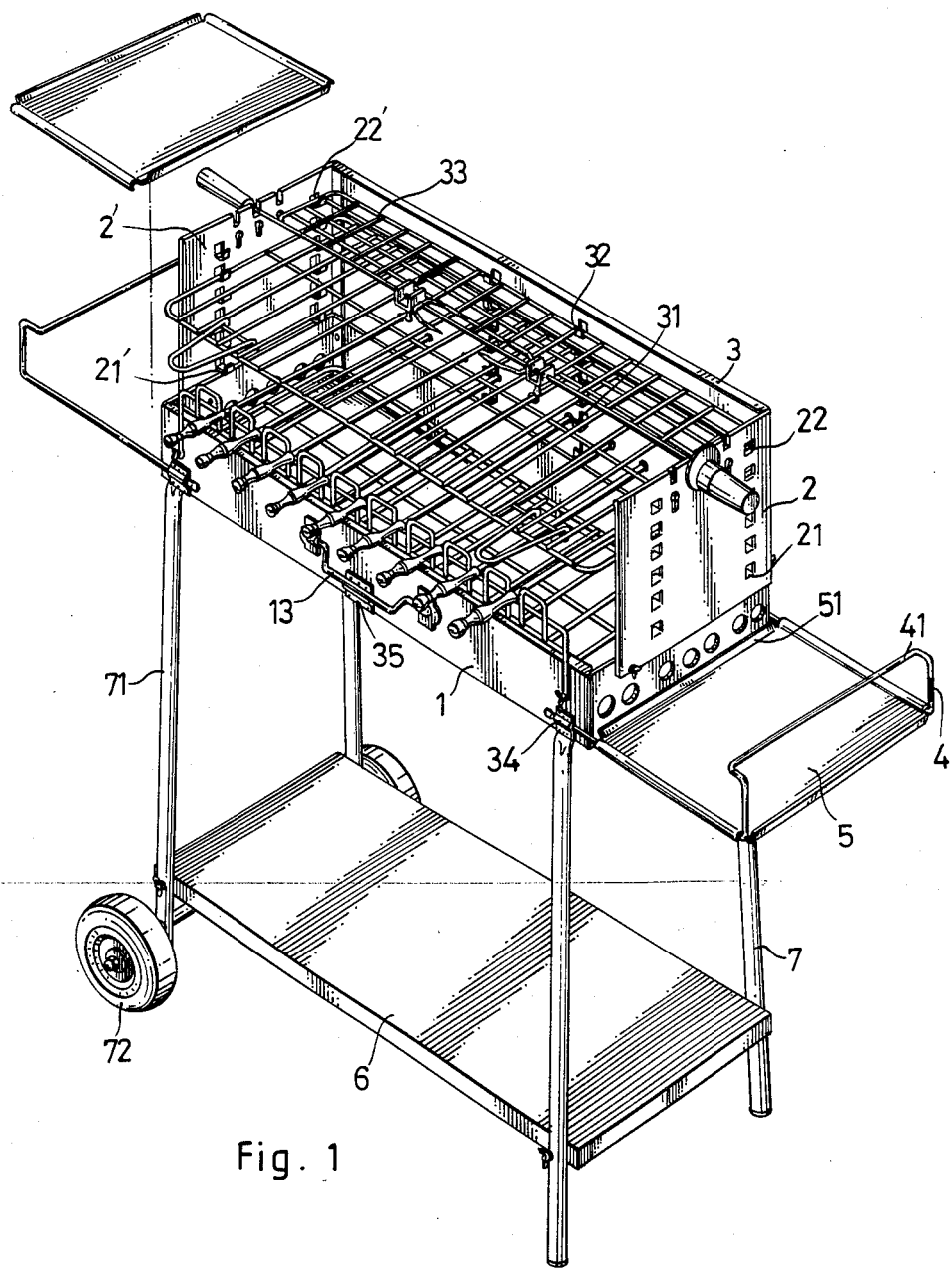
FIG. 1 is a perspective assembly view of a portable trolley barbecue embodying the present invention.
Figure 3:
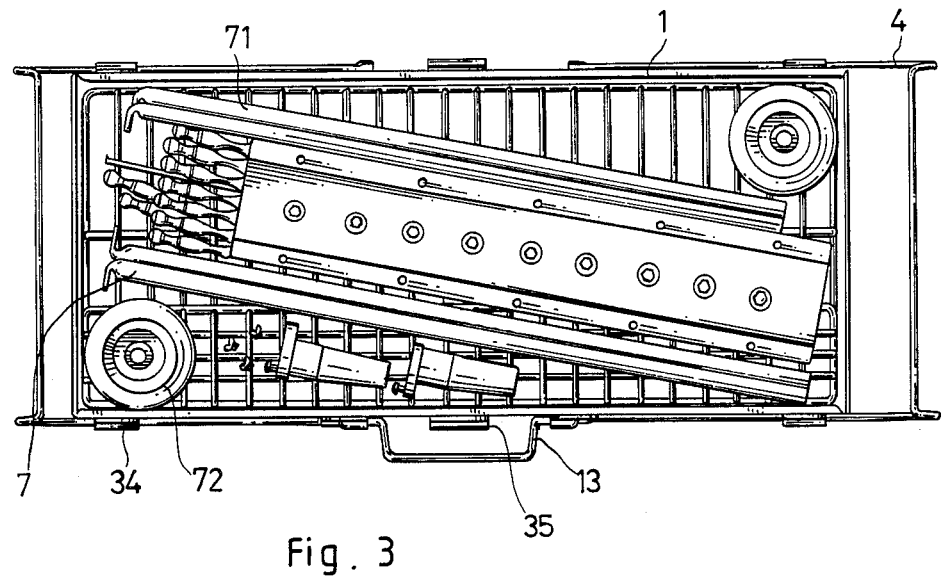
FIG. 3 is a schematic drawing of the preferred embodiment, illustrating the inner collapsed arrangement.
Figure 2:
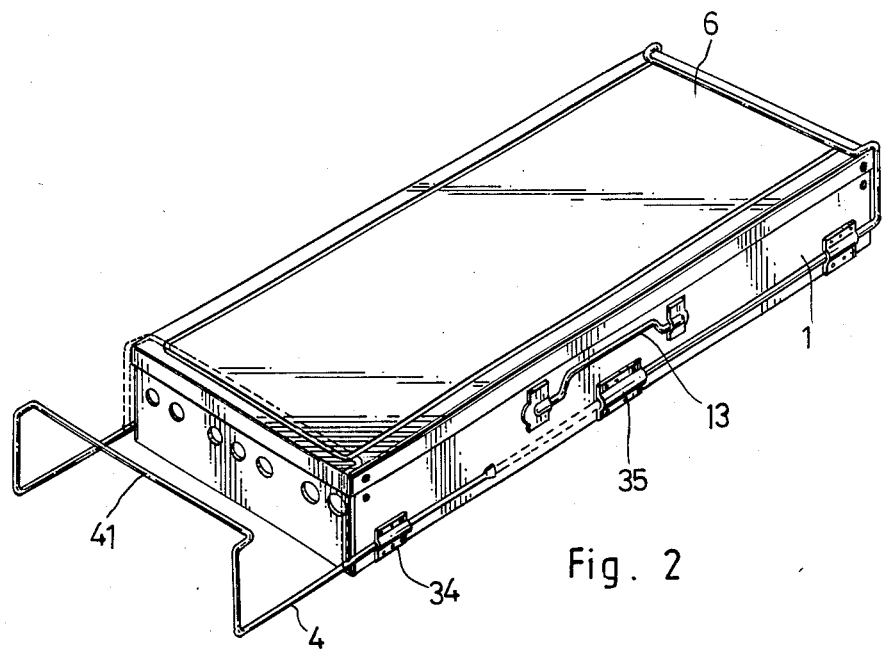
FIG. 2 is a schematic drawing of the preferred embodiment, illustrating the collapsed configuration when all component parts are locked up.
Figure 5:
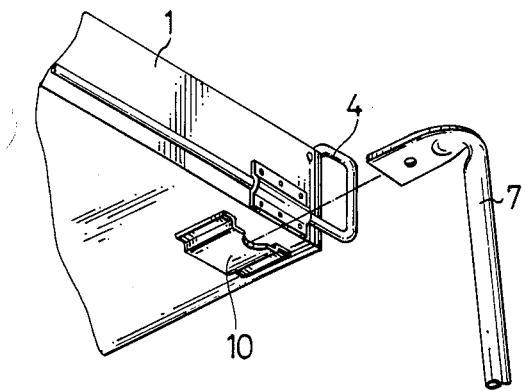
FIG. 5 is a structural view drawing, illustrating the connection of the stand with the base of the barbecue.
Figure 6:
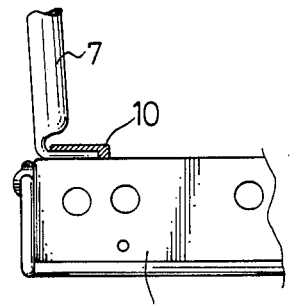
FIG. 6 is a schematic assembly drawing of the stand and the base of trolley barbecue.
Figure 4:
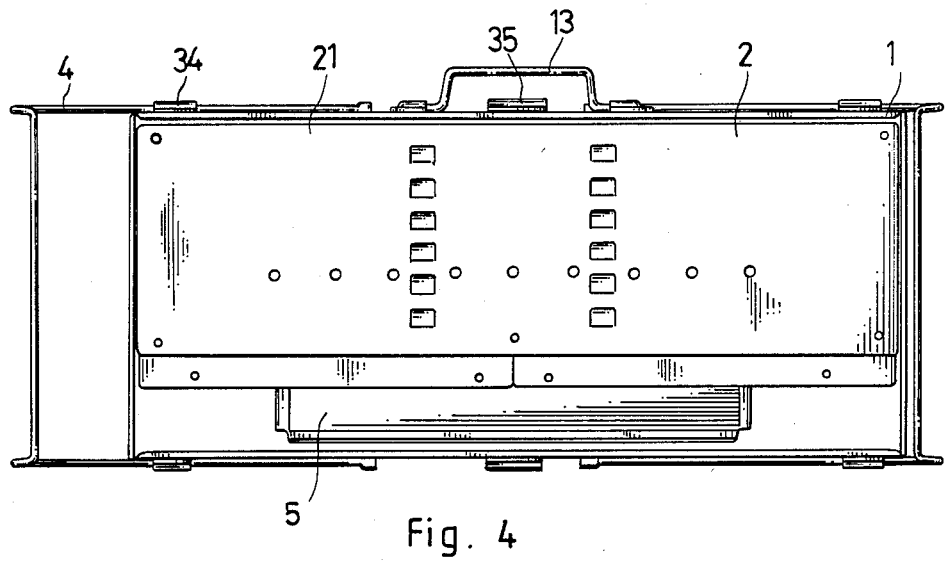
FIG. 4 is a schematic drawing of the preferred embodiment, illustrating the collapsed portable configuration for storage.
Figure 9:
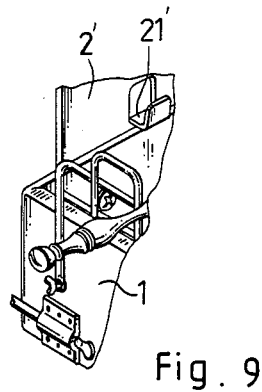
FIG. 9 is a schematic drawing of the present invention, illustrating the assembly of a side plate with the base of the barbecue.
Figure 7:
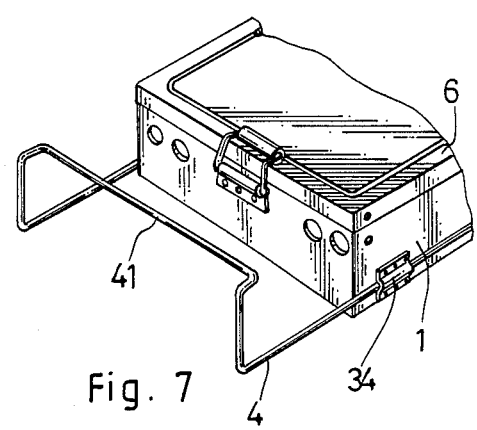
FIG. 7 is schematic drawing of another embodiment of the fastener of the cover plate.
Figure 8:
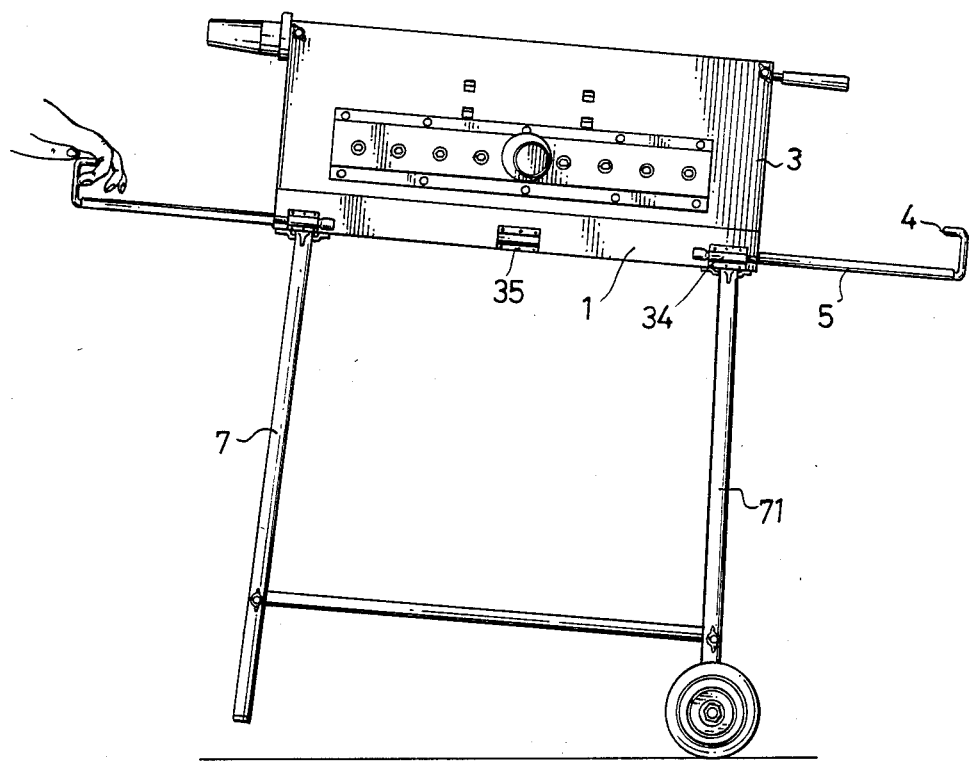
FIG. 8 is a schematic view drawing of the trolley barbecue when it is built up.
Figure 10:
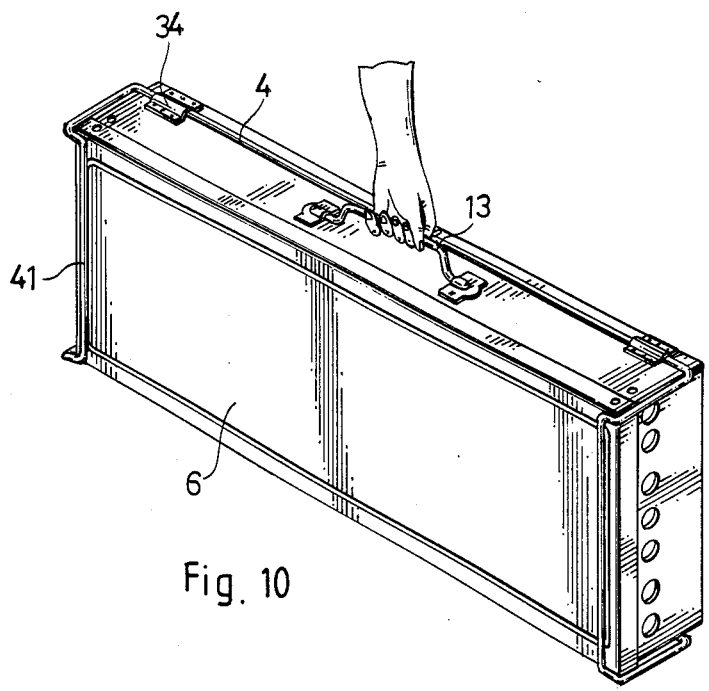
FIG. 10 is a schematic view drawing of the present invention, when it is collapsed to form into a portable configuration.

Referring to the perspective assembly view of the preferred embodiment of the present invention as shown in FIG. 1, a trolley barbecue, according to the present invention, comprises a rectangular parallelepiped base 1 having reinforced edge, one pair of side wall plates 2, 2' symmetrically arranged at both sides to pivotally connected with the base 1, and one back side plate 3 arranged at back side to connect with the base 1 by pivotal joint. The said two side wall plates 2, 2' and the said back side plate 3 are respectively arranged to provide a plurality of slot-hooks 21, 21', 31 in symmetrical lines. While in assembly, the bottom surface of the lowest level of slot-hooks 21, 21', 31 are arranged to be in contact with the top edge of the base 1 to let respective pivotal holes be aimed each other for easy connection. The top level of slot-hooks 22, 22', 32 are arranged for hanging of a heat isolating wire net 33 to keep the well roasted meat warm. The base 1 is also arranged to provide two lateral U-shaped brackets and one central U-shaped bracket 34, 35 in fixed type (by either releasable or rivet joint or any other fixing measures) at the front side as well as at the back side. One pair of the U-shaped brackets 34 at each side are connected with an expansion frame 4 by slip joint. The said expansion frame 4 is arranged in a geometric configuration (inverted U-shaped) with the closed end being bent to provide an extended portion 41 in a geometric configuration to act as a handle for hand to push the oven cart (as illustrated in FIG. 8). A side table plate 5 is provided which can be placed on each expansion frame 4 at the time the respective expansion frame is drawn out. Each said side table plate 5 is well reinforced at the edge to provide a folded slot 51 around the circumference. When collapsing, each expansion frame 4 is pushed inward with both ends respectively inserted into the central U-shaped brackets 35 and with the extended portion 41 mounted on the bottom side of the base 1 to lock up a movable and separate cover plate 6 at the bottom side of the base 1 (as illustrated in FIG. 2), such that the base 1 and the cover plate 6 form a closed space for arrangement of component parts thereinside, such as side plates, back plate, skewers, wire net, table plate, and stands. The said cover plate 6 may also be arranged to provide snap fastener 60 to match with the hook plate 19 of the base 1 (as shown in FIG. 7), to become a portable type (as illustrated in FIG. 10). The base 1 is also arranged to connect with four pieces of collapsible stands 7, which are collapsed and to be arranged inside the base 1. Each said stand 7 is folded at one end to provide a flat portion for insertion into the respective matching plate 10 at the four bottom corners of the base 1 (as shown in FIGS. 5, 6), such that the oven is set up with four stands. One pair 71 of said four pieces of stands 7 are respectively attached with a wheel 72 by releasable joint to let the built-up barbecue become a trolley (as shown in FIGS. 8, 9) with the extended portion 41 of the expansion frame 4 provided for hand to push and pull. When to setting up the present collapsible barbecue, the said cover plate 6 is separated from the base 1 and connected with the said four stands 7, 71 by releasable joint, so as to provide an area among the four stands for placing articles thereon, and to confine the four stands 7, 71 letting the whole assembly be more stable.

In general, the present invention is a built-up type, which is portable and collapsible. When the barbecue is set up, it provides extended space for arrangement of articles thereon. When it is collapsed, by means of the expansion frame to lock up the base and the cover plate, the barbecue provides an inner space for arrangement of all component parts thereinside. By means of the attachment of a handle 13, the present barbecue is collapsed to become portable. By means of the arrangement of the expansion frame, the whole assembly of the collapsed barbecue is supported to stably stand still when it is vertically placed.

I claim:

1. A portable trolley barbecue which comprises a base having a front, a back, and two lateral sides, two pairs of lateral U-shaped brackets on each lateral side respectively near the front and rear and one pair of central U-shaped brackets at a middle portion of each lateral side, each pair of the lateral U-shaped brackets being arranged to receive an expansion frame for supporting a side table plate placed thereon and for providing an extended portion for pushing and pulling the portable trolley barbecue, and a cover plate for covering the base and for being locked together with the base by the expansion frames when the expansion frames are respectively pushed inward into the central U-shaped brackets, the cover plate having four corners with holes for respectively being connected to four stands by releasable joints, whereby the barbecue can be collapsed and arranged into a portable configuration for carriage and storage and can be set up into a trolley barbecue.

2. The portable and trolley barbecue according to claim 1, wherein each expansion frame is arranged such that it has a closed end folded upward to provide an inverted-shaped bend.

* * * * *